(12) United States Patent
Jagtøyen

(10) Patent No.: US 6,964,518 B1
(45) Date of Patent: Nov. 15, 2005

(54) DEVICE AND SYSTEM FOR MONITORING INTERNAL TEMPERATURE OF INACCESSIBLE OR MOVING PARTS

(75) Inventor: Andreas Jagtøyen, Leinstrand (NO)

(73) Assignee: Kongsberg Maritime AS, Trondheim (NO)

( * ) Notice: Subject to any disclaimer, the term of this patent is extended or adjusted under 35 U.S.C. 154(b) by 0 days.

(21) Appl. No.: 09/937,304

(22) PCT Filed: Mar. 23, 2000

(86) PCT No.: PCT/NO00/00105

§ 371 (c)(1),
(2), (4) Date: Dec. 20, 2001

(87) PCT Pub. No.: WO00/62029

PCT Pub. Date: Oct. 19, 2000

(30) Foreign Application Priority Data

Mar. 26, 1999 (NO) .................................. 991514

(51) Int. Cl.[7] .......................... G01K 1/16; G01K 13/04
(52) U.S. Cl. ...................... 374/154; 374/117; 374/210; 340/870.17
(58) Field of Search ................................ 374/153–154, 374/152, 141, 208, 210, 117–119, 189; 340/870.17, 340/501, 588–589, 584–585; 310/313 R, 310/315

(56) References Cited

U.S. PATENT DOCUMENTS

| | | | | |
|---|---|---|---|---|
| 3,765,242 A | * | 10/1973 | Bailleu ........................ 136/230 |
| 3,769,839 A | * | 11/1973 | Innes ........................ 73/339 A |
| 3,877,411 A | * | 4/1975 | MacDonald ................. 116/101 |
| 3,878,502 A | * | 4/1975 | Rochelle ..................... 340/5 R |
| 4,020,693 A | * | 5/1977 | Ahlgren et al. ............. 374/118 |
| 4,197,742 A | * | 4/1980 | Freiberg et al. ............. 374/154 |
| 4,213,104 A | * | 7/1980 | Cullen et al. ................ 333/150 |
| 4,398,115 A | * | 8/1983 | Gagnepain et al. ..... 310/313 A |
| 4,730,979 A | * | 3/1988 | Hook, Jr. ..................... 415/418 |
| 4,855,671 A | * | 8/1989 | Fernandes ................... 324/127 |
| 4,947,786 A | * | 8/1990 | Maynard et al. ............ 116/218 |
| 4,948,264 A | * | 8/1990 | Hook, Jr. ..................... 374/144 |
| 5,070,706 A | * | 12/1991 | Waters et al. ................. 62/129 |
| 5,183,338 A | * | 2/1993 | Wickersheim et al. ...... 374/131 |
| 5,257,863 A | * | 11/1993 | Chu et al. .................... 374/153 |
| 5,289,160 A | * | 2/1994 | Fiorletta ..................... 340/447 |
| 5,335,995 A | * | 8/1994 | Villar .......................... 374/208 |
| 5,438,322 A | | 8/1995 | Martin et al. ............... 340/584 |
| 5,446,452 A | * | 8/1995 | Litton .................... 340/870.17 |
| 5,513,525 A | * | 5/1996 | Schurmann ................. 73/146.5 |
| 5,556,204 A | * | 9/1996 | Tamura et al. .............. 374/161 |
| 5,585,577 A | * | 12/1996 | Lemoine et al. ........... 73/866.5 |
| 5,642,105 A | * | 6/1997 | Duffy et al. ........... 340/870.17 |
| 5,711,607 A | * | 1/1998 | Bernstein ..................... 374/179 |

(Continued)

FOREIGN PATENT DOCUMENTS

AU         199869854       12/1998

(Continued)

*Primary Examiner*—Gail Verbitsky
(74) *Attorney, Agent, or Firm*—Finnegan, Henderson, Farabow, Garrett & Dunner, L.L.P.

(57) ABSTRACT

A device and a system for measuring temperature in an inaccessible and/or movable mechanical part. The device comprises a temperature-sensitive clement which can be installed inside the movable part and which is designed to emit a signal containing information on the temperature of said clement, in such a way that this signal can be received by a control unit. The temperature-sensitive clement is a SAW chip which is arranged at the lower end of a hole in the mechanical part whose temperature is to be measured and it is connected to a first antenna provided outside said hole in said mechanical part.

10 Claims, 6 Drawing Sheets

U.S. PATENT DOCUMENTS

Figure 1:
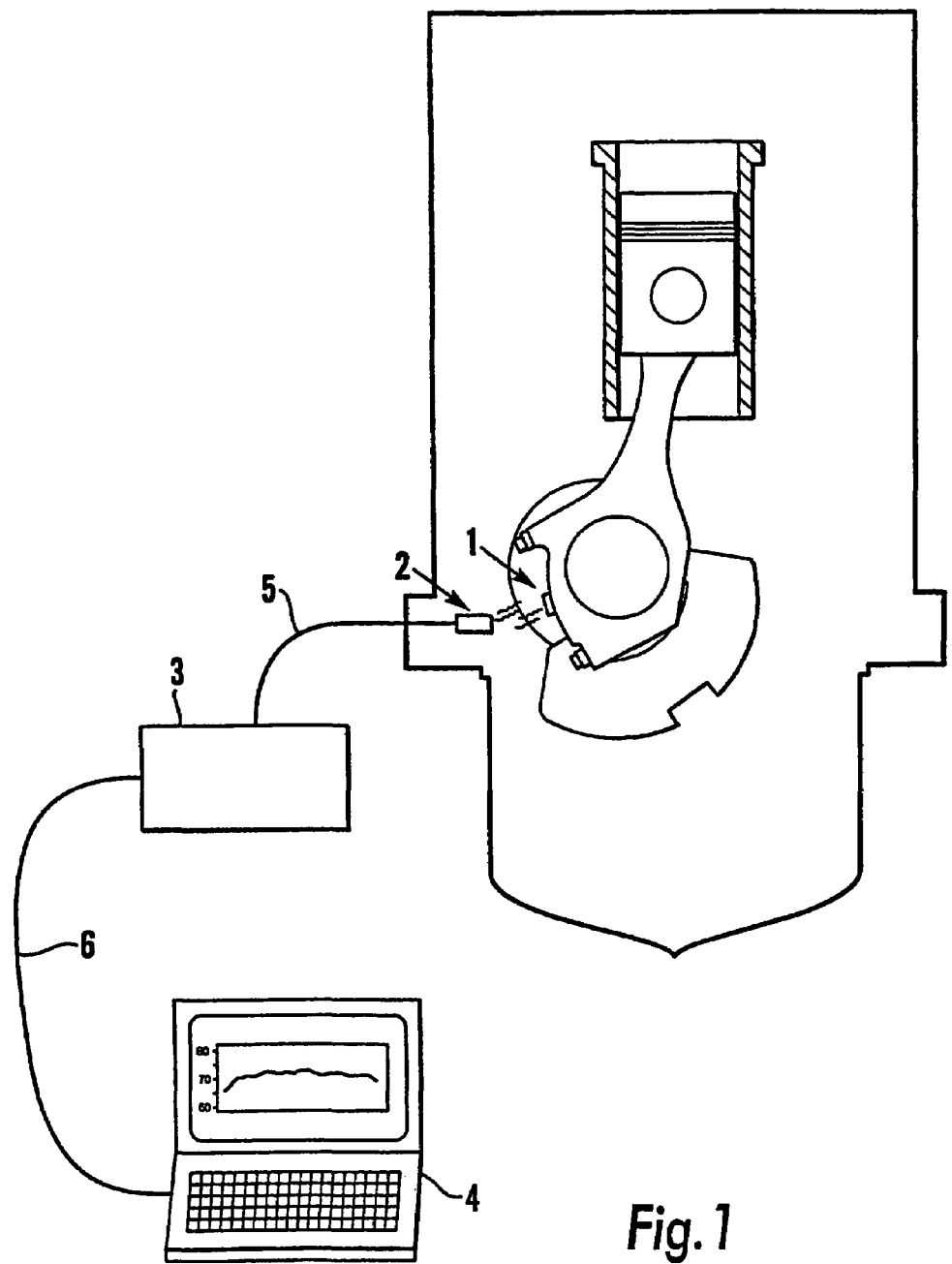

| | | | |
|---|---|---|---|
| 5,760,526 A * | 6/1998 | Anderson | 310/313 R |
| 5,805,080 A * | 9/1998 | Lemoine et al. | 340/870.16 |
| 5,892,417 A * | 4/1999 | Johnson et al. | 333/193 |
| 5,939,977 A * | 8/1999 | Monson | 340/442 |
| 6,239,723 B1 * | 5/2001 | Bauerschmidt et al. | 340/870.11 |
| 6,286,992 B1 * | 9/2001 | Kyrtsos | 374/45 |
| 6,314,811 B1 * | 11/2001 | Goldner et al. | 73/570 |
| 6,378,360 B1 * | 4/2002 | Bartels | 73/146.5 |
| 6,407,695 B1 * | 6/2002 | Stierlin et al. | 342/42 |
| 6,848,295 B2 * | 2/2005 | Auner et al. | 73/24.06 |
| 2002/0008438 A1 * | 1/2002 | Carpenter | 310/313 R |
| 2002/0157895 A1 * | 10/2002 | Dubinsky et al. | 181/102 |
| 2003/0048178 A1 * | 3/2003 | Bonardi et al. | 340/442 |
| 2004/0190591 A1 * | 9/2004 | Zhang | 374/162 |

FOREIGN PATENT DOCUMENTS

| | | | | |
|---|---|---|---|---|
| CN | 2103135 | | 4/1992 | |
| DE | 43 12 596 | | 10/1994 | |
| DE | 197 24 784 | | 3/1997 | |
| DE | 197 23 127 | | 12/1998 | |
| DE | 20006944 U1 * | | 8/2000 | B60C 23/02 |
| EP | 0 627 716 | | 4/1994 | |
| EP | 0736972 A1 * | | 10/1996 | H03H 9/05 |
| GB | 2 070 393 | | 9/1981 | |
| WO | 93/13495 | | 7/1993 | |
| WO | 97/09596 | | 3/1997 | |

* cited by examiner

DEVICE AND SYSTEM FOR MONITORING INTERNAL TEMPERATURE OF INACCESSIBLE OR MOVING PARTS

The invention relates to a device and a system for monitoring temperature inside inaccessible and/or movable parts.

In large or medium-sized machines and engines, such as for example diesel engines, there are many bearings which may be damaged during operation. In order to prevent this the standard procedure to date has been to monitor such bearings by means of continuous temperature or vibration measurement, or by periodic measurements of the same parameters. In large diesel engines requirements have been introduced from classification societies regarding temperature monitoring of main bearings. These requirements, however, have not been introduced in connection with crankshaft bearings, the reason being that no equipment exists which is suitable for measuring this temperature.

For 4-stroke medium and high-speed diesel engines it will be an enormous advantage if damage to the crankshaft bearings can be detected at an early stage. In these engines the damage can develop quickly, and the consequences of a crankshaft bearing breakdown are often highly dramatic.

Serious engine damage usually occurs when primary damage (initiating damage) leads to engine breakdown. An example of such primary damage may be that the piston loses the lubrication in the cylinder due to carbon formation on the piston crown, or due to a fault in the combustion in the cylinder. The piston will begin to move sluggishly, thereby inflicting greater loading/surface pressure on the crankshaft bearing. Another example of primary damage which can result in serious engine damage is lubricating oil failure to the crankshaft bearing on account of failure in the supply from the lube oil pump or clogged oil channels in the crankshaft. A final example of primary damage which may be mentioned in this connection is when a crank bolt loosens or breaks.

In all probability, all of the above-mentioned situations will inflict enormous damage on the engine, especially on the crankshaft, piston rod (connecting rod), and the engine block. In many cases the piston rod is torn loose from its attachment-in the piston (which cracks), and in the worst case some of the rotating parts may be thrown out of the engine. Developments of this kind may entail great risk for the engine-room crew if they are in the vicinity of the engine. If the engine is providing for a ship's propulsion, the ship may lose its propulsion and manoeuvring ability over a considerable period, which can result in running aground and pollution problems.

A sufficiently fast temperature sensor will enable the engine to be shut down so early that such serious damage can be avoided and in the worst case it will only be necessary to replace parts or carry out repairs in connection with the primary damage which caused the temperature increase.

So far the problem has been described in connection with engine parts in general and crankshaft bearings in large and medium-sized diesel engines in particular. However, similar problems occur in connection with a number of rotating parts, for example in electric motors, wheel bearings, brake discs and so on.

In SE-B-391.031 a device is described for measuring temperature in a movable mechanical part. The publication shows how this device can be employed for monitoring the temperature in the crosshead bearing in a diesel engine. In this device the sensor is a temperature-sensitive resistor, and the transmission of the test signals is performed capacitively. Similar solutions also exist where the signal transmission is performed by means of sliding contacts or inductively. There is an element of uncertainty concerning the measurement in all of these alternatives due to the fact that the circuits' electrical properties can change, and none of them permit transmission of data without electrical contact other than over extremely short distances.

WO 97/09596 describes a sensor for detection of status data, including temperature, in an electric motor. The sensor is formed from a surface wave acoustic element, or a SAW chip. The SAW chip's properties are altered as a function of the physical conditions which have to be measured, which results in alteration of the transmitting function. A polling signal in the form of a radio signal with specific properties is transmitted from a polling unit and received by the SAW chip. There it is converted to an electrical signal and then to an acoustic signal which is transmitted along the element's surface and reflected, whereupon it is converted back first to an electrical signal and then to a radio signal which is returned to the polling unit. There the physical status data are derived based on the changes in the polling signal which are a result of changes in the SAW chip's transmitting function. The publication describes how it is possible to place the sensor inside a winding and connect it to an antenna which is located on the outside thereof. However, it does not describe how such a sensor may be designed in order to be capable of being installed in a suitable manner and to be sufficiently robust to be used in a particularly harsh environment.

A similar sensor is described in WO 93/13495, intended for wheel bearings and brake blocks on trains.

SAW chips, however, are not particularly robust in a harsh environment, and in the previously known applications it has only been proposed that they should be installed on the surface of the component which is to be monitored. This is due first of all to the fact that it is simple and requires no modification to the actual component, and secondly that if the SAW chip were located inside the component it would be difficult to transmit the polling signal, since the component which is to be monitored would act as a screen. The previously known sensors of this type are therefore not suitable for a great many applications, especially in connection with engines and particularly for measuring temperature deeper inside a component than at the surface.

U.S. Pat. No. 5,438,322 discloses a temperature sensor which is in the form of a bolt. However, it contains a radio transmitter which, if the temperature exceeds a certain critical value, is pressed against the bolt's surface and activated, thus causing an alarm signal to be transmitted. The sensor can therefore not supply information on what the actual temperature is, but is only designed to emit an alarm signal if a threshold is exceeded.

In contrast to the previously known solutions, the present invention provides a sensor which is robust with regard to a harsh environment, and which can also be employed for measuring the temperature deep inside the component which is to be monitored. Furthermore, the invention makes it possible to transmit temperature data from the sensor to a receiver even though the sensor is installed on a part which is movable relative to the receiver and is located at a certain distance from the receiver.

The above-mentioned characteristics are achieved by means of the characterising features which are set forth in the independent claims.

In addition to the characteristics which are mentioned above, the invention provides a system which can easily be mounted in already-existing installations. This installation may, for example, be performed by fitters from the equipment supplier. Thus there is no requirement that suppliers of engines and other machines should design these systems in such a manner that they are ready for use together with the present invention.

Figure 2:
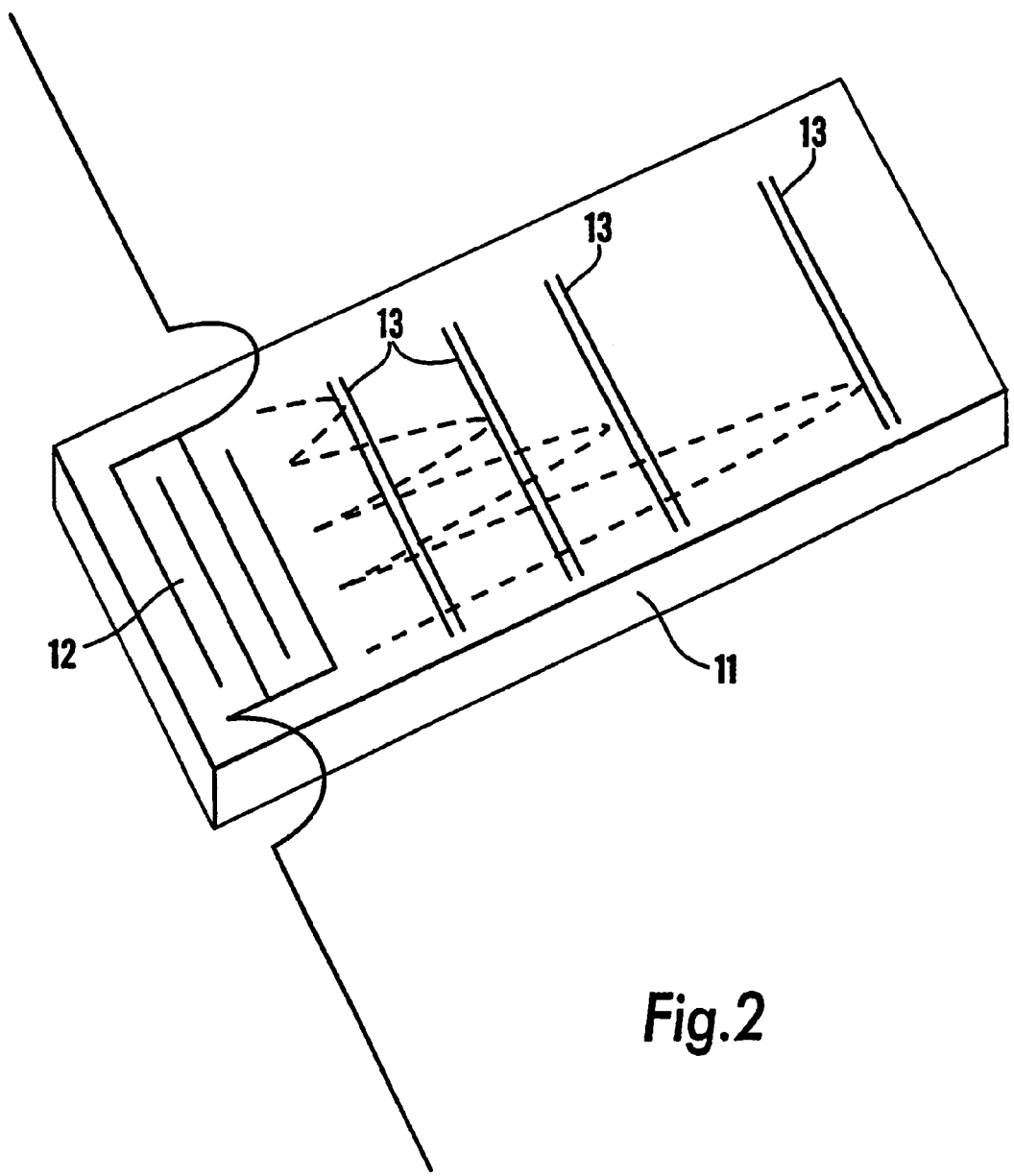
Figure 3:
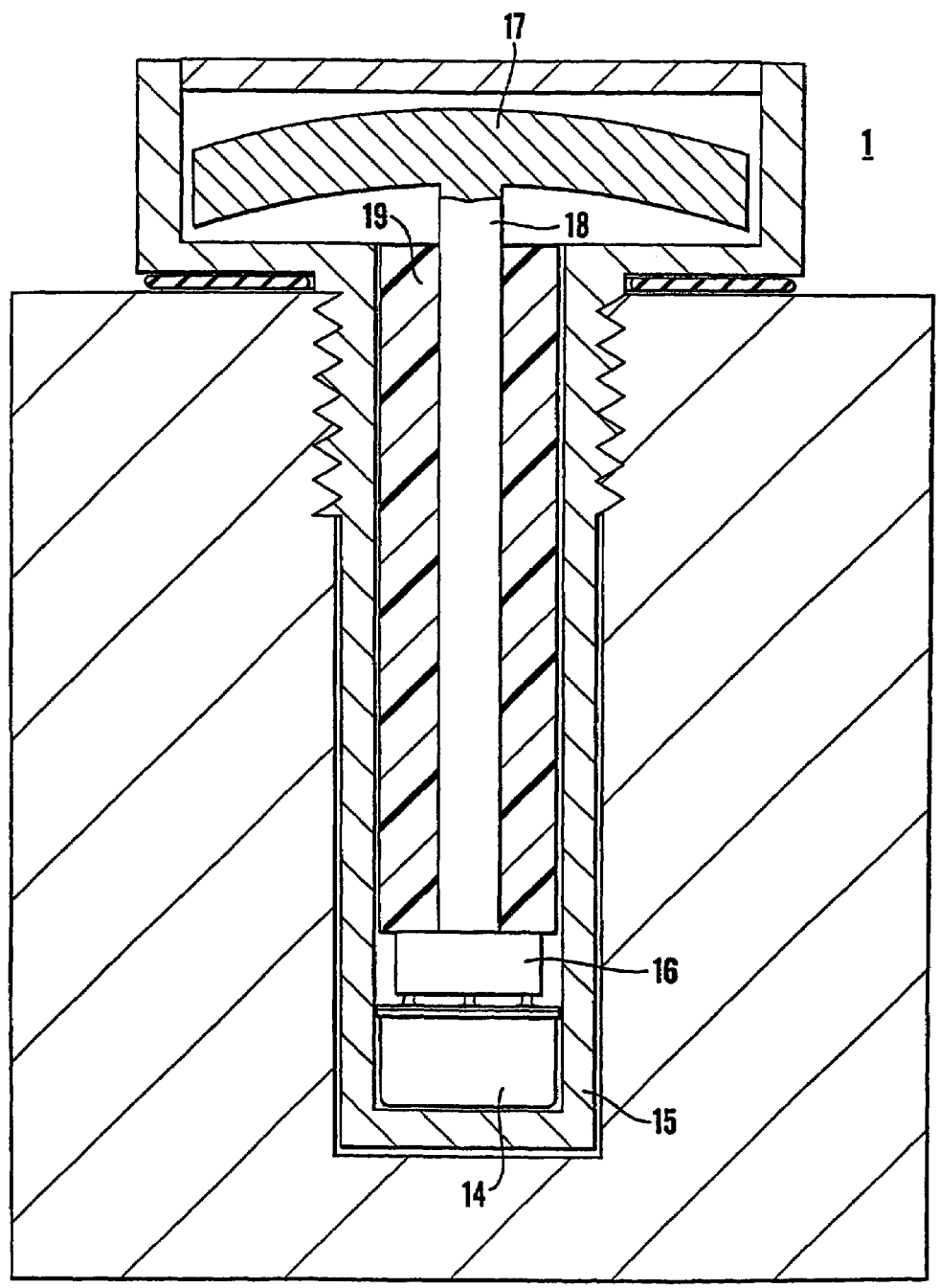
Figure 4:
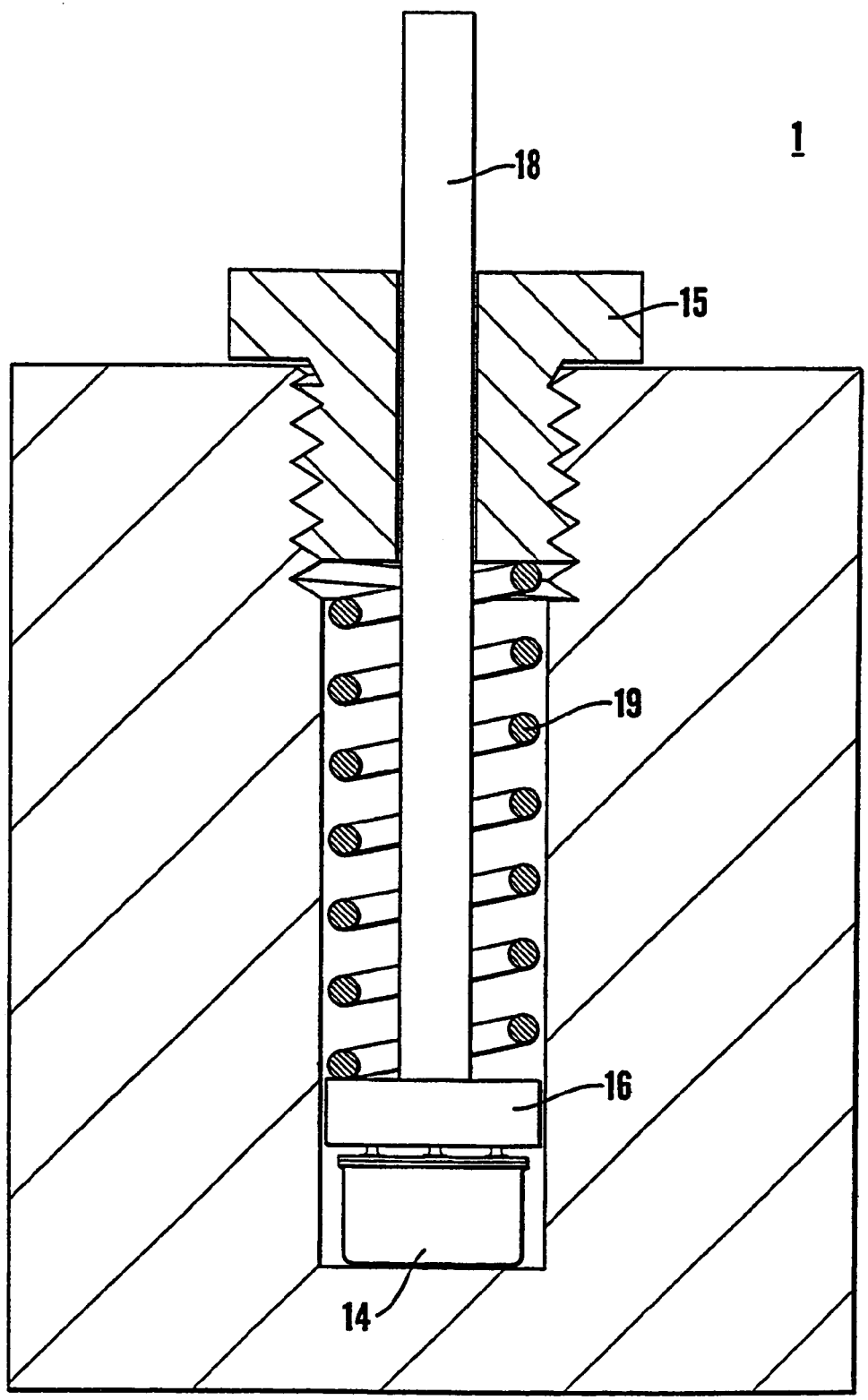
Figure 5:
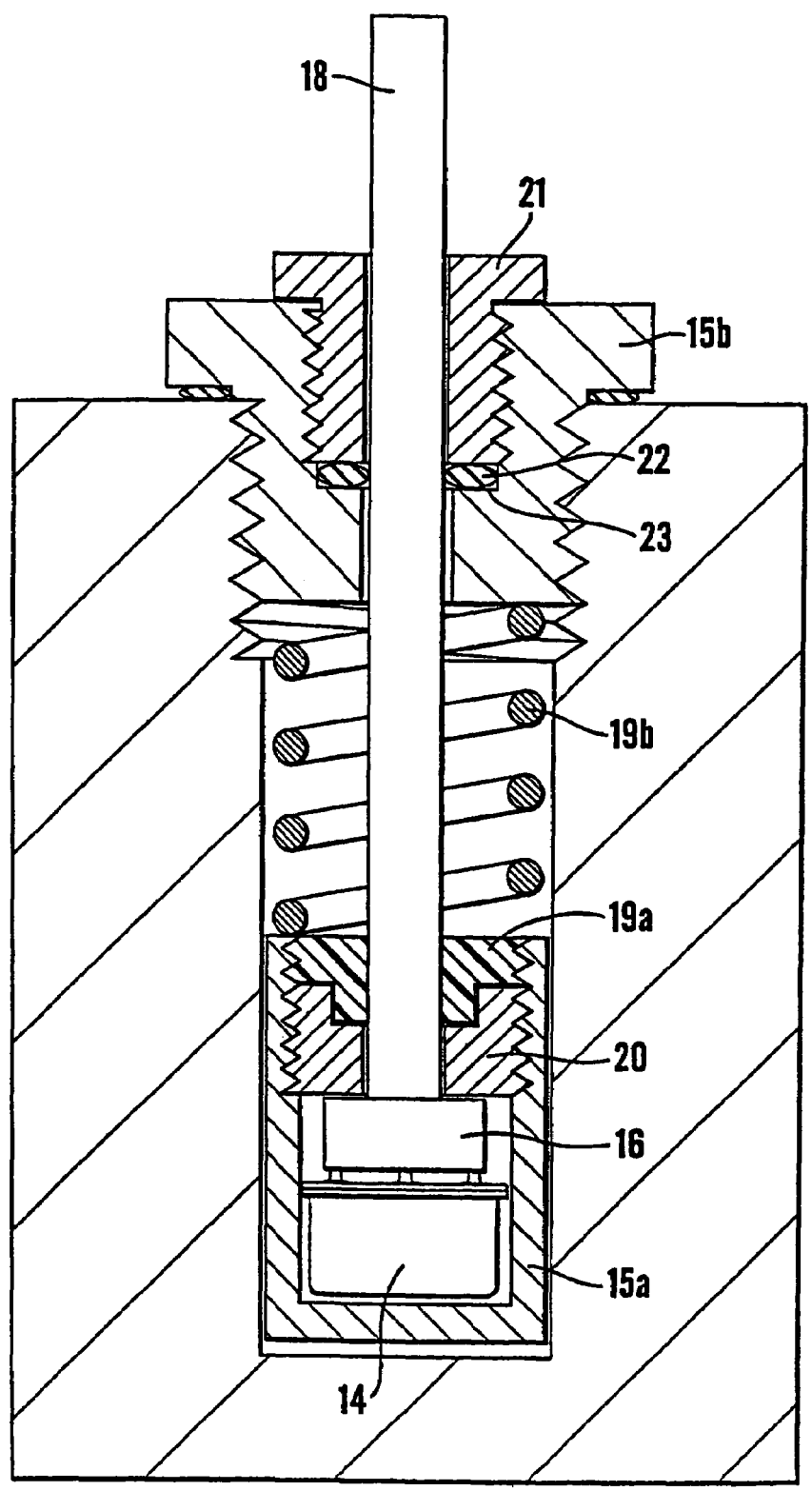
Figure 6:
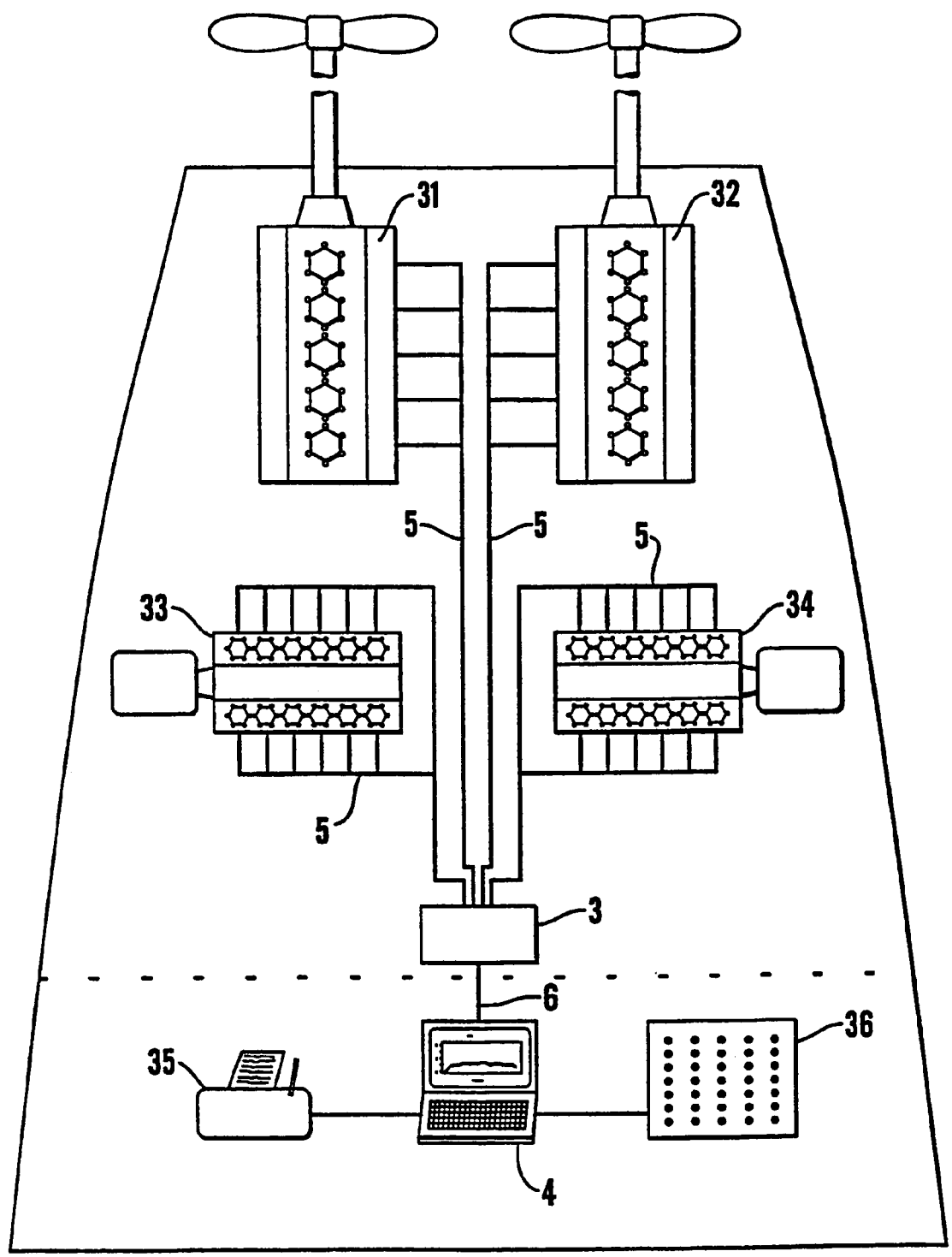

The invention will now be described in further detail in the form of an exemplary embodiment and with reference to the attached drawings, in which:

FIG. 1 is a principle drawing of an application where the invention is used for measuring temperature in crankshaft bearings, FIG. 2 illustrates a SAW chip which can be employed as a sensor element in the present invention, FIG. 3 illustrates the design of a sensor for temperature monitoring according to the present invention, FIG. 4 illustrates an alternative design of a sensor for temperature monitoring according to the present invention, FIG. 5 illustrates another alternative design of a sensor for temperature monitoring according to the present invention, FIG. 6 illustrates the use of the present invention in monitoring a ship's engine installation.

FIG. 1 illustrates how the present invention can be employed in a system for measuring temperature in crankshaft bearings, especially in large and medium-sized diesel engines. The system consists of four main components, viz. sensors 1 (preferably one for each cylinder), antennae 2 (preferably one for each sensor), a control unit 3 and a recording unit 4. Here the sensors 1 are installed freely in the crankshaft bearing housing. The antennae 2 are installed inside the engine and connected to the control unit 3 which preferably comprises a multiplexer to enable test data to be received from more than one antenna/sensor. The control unit 3 will preferably be installed near the engine and connected to the antennae 2 via signal cables 5. The recording unit 4 is preferably a computer with software for storing historical data, display of test data in graphic and alphanumeric form, configuration of alarm limits, possibly communication with an alarm centre, printing of reports etc. This unit will preferably be placed in the control room for the machine or the engine which is to be monitored and it will be connected to the control unit via a standard connection for data transfer, for example a data bus solution 6. In many cases this computer could be a computer which is already located in such a control room, and which simultaneously runs other software associated with the operation of the machine which is to be monitored.

The control unit 3 is designed to be capable of transmitting a polling signal to one of the sensors via the multiplexer and the antenna 2 which is connected to the sensor concerned 1. This polling signal will be reflected in modified form (e.g. with time delay or phase change) from one or more points on the sensor's 1 surface, returned from the sensor to be received by the antenna 2, and then returned to the control unit 3 possibly via a multiplexer. In the control unit the modified signal will be evaluated and the temperature in the crankshaft bearing derived therefrom. The derived temperature is then transferred to the recording unit 4 for recording and further processing.

FIG. 2 illustrates how the temperature-sensitive element itself may be designed. The element is composed of a SAW chip with a transducer 12, often called a interdigital transducer, and one or more reflectors 13. When a high-frequency signal is applied to the transducer 12, this signal will be converted to an acoustic signal which is transmitted along the SAW chip's surface, reflected at the respective reflectors 13 and returned to the transducer in the form of a modified signal composed of the signals reflected from the respective reflectors. The transducer 12 converts the reflected signals back to electrical signals which are emitted from the transducer. The characteristics of the signal path along the SAW chip's surface, however, are dependent on the temperature of the SAW chip. The SAW chip will therefore act as a signal processing element with temperature-dependent transfer function. Changes in the transfer function will be able to be derived from the characteristics of the reflected signal, and on this basis the temperature can be derived. This will be discussed in more detail below.

FIG. 3 illustrates an example of how the sensor 1 may be designed. The actual temperature-sensitive element, the SAW chip 11, will normally be encapsulated in a housing. In the following, the component which is composed of the SAW chip and its encapsulation or housing are referred to as the sensor element 14. In this example the sensor element 14 is located in a bolt 15. The sensor element 14, however, may also be located freely in the part which is to be monitored, which will be described in more detail below. The element is installed, for example, in a holder or socket 16, which may also be a small circuit board, which in turn is connected to an antenna 17, for example by means of a transmission line 18, such as a coaxial cable. The antenna 17 is located in such a way that it projects out of the part which is to be monitored. The antenna 17 may be installed at the bolt's upper end, for example in the form of a small circuit board. In this example, therefore, the antenna is an integrated part of the bolt 1 which forms the sensor. However, the antenna may also be provided separately and connected to the sensor via an extension of said transmission line 18.

When a polling signal is received by the antenna 17, it is transferred to the sensor element 14 where the received signal is converted to an acoustic signal which is applied to the SAW chip, as already described. When the reflected signal is received by the transducer 12, it is converted from an acoustic to an electrical signal which is applied to the antenna 17 and is transmitted therefrom as the modified polling signal. This signal is received by the antenna 2 and further processed as described above.

The actual design of the bolt 15 can vary depending on what kind of environment the sensor 1 is to be placed in. In a preferred embodiment the bolt will be designed with external threads, thus enabling it to be screwed into the component in which it is to be installed. However, other designs are also possible. For example, the bolt 15 may be designed with a smooth surface or a surface with a certain degree of roughness, and forced into a narrow hole where it is secured by tension and friction. The inside of the bolt 15 will preferably be filled with a material 19 which keeps the respective components in position, for example epoxy or a heat-resistant rubber sleeve.

An alternative design is illustrated in FIG. 4, where the same or corresponding components to those illustrated in FIG. 3 have been given the same reference numbers. In this example the sensor element 14 is not mounted inside a bolt. The bolt 15 in this case only serves to close the installation hole and secure the actual components. Instead, the sensor element 14 is mounted freely at the bottom of a hole in the part which is to be monitored. In the same way as in the example illustrated in FIG. 3, the sensor element may be mounted in a holder 16 and connected to a transmission line 18. This transmission line will in turn be connected to an antenna (not shown) on the outside of the part which is to be monitored. In the example in the figure it is shown how a spring 10 which is secured by the bolt 15 presses the sensor element 14 against the bottom of the hole. As an alternative to a spring, a sleeve may be employed made of a suitable material such as for example heat-resistant rubber. The hole may be filled with epoxy or the like, but it will not be a preferred solution in this embodiment, since it will make it difficult to remove/replace the sensor element 14 and the other components.

A further embodiment is illustrated in FIG. 5, where corresponding reference numbers to those in the previous figures are again employed. In this embodiment the sensor element 14 and the holder 16 are installed inside an encapsulation 15*a* which is closed by a screw 20 with a hole for passing through the transmission line 18. This passage may in turn be sealed, for example, by epoxy 19*a*. In its turn this encapsulation will be pressed against the bottom of the hole in which it is located by a spring 19*b* or a sleeve which in turn is kept in position by a bolt 15*c* with a hole for passing through the transmission line. In the example in the figure there is provided in this hole a screw 21 which presses a gasket or O-ring 22 against an internal surface 23 in the bolt 15*b*, with the result that the O-ring 22 tightly encloses the transmission line 18. The transmission line 18 in turn is connected to an antenna (not illustrated) on the outside of the part which is being monitored.

While the design which is described with reference to FIG. 3 is well-suited to standard lengths, i.e. when the actual temperature-sensitive element always is to be installed the same distance inside the part which is to be monitored, the embodiments which are illustrated in FIGS. 4 and 5 are suitable for variable lengths, where the depth of the individual mounting hole determines how far into the part which is to be monitored the temperature-sensitive element is installed.

When installing the sensor in the component which is to be monitored, it is important to avoid causing it any damage which impairs the component unnecessarily. If the sensor is to monitor a component which is exposed to stress, as will be the case with a crankshaft bearing, it is therefore vital to prepare specifications for where and how the installation should take place, and that this task is performed by qualified specialists.

FIG. 6 illustrates how the present invention can be employed in the monitoring of a ship's engine installation consisting of two main engines 31, 32 and two auxiliary engines 33, 34. A number of sensors with associated antennae are arranged in each engine as already described, and these are connected to a control unit 3 which in this example comprises a multiplexer or another form of selector which controls the signals to and from the respective sensors. The control unit 3 is preferably placed in the engine room near the engines. From the control unit 3 the signals are transmitted via a data bus 6 to a computer 4 which constitutes the recording unit described above and which is placed in the ship's control room. This is connected to a printer 35 and an alarm centre 36.

From the control unit 3 the computer 4 receives data signals carrying information on the temperature measured at the different sensors. This information preferably contains both temperature data and data identifying the individual sensor, but alternatively the computer 4 may control the multiplexer in the control unit 3 in such a manner that temperature data are always received from the sensor to which the computer chooses to transmit a polling signal. The received temperature data are stored in the computer, and temperature information can be displayed graphically or alphanumerically on the computer screen. Temperature lists and historical data can also be printed out on the associated printer.

The computer will preferably be programmed to react to temperatures which exceed defined alarm thresholds. If one of the sensors indicates a temperature higher than the defined temperature threshold, an alarm signal will be generated which is transmitted to an alarm centre 36. It may also be indicated on the computer that an alarm condition exists. The alarm centre may be designed in a number of different ways in order to indicate that an alarm condition exists in the form of visual or audible information. The alarm centre 36 or the computer 4 may also be arranged to shut off one or more of the engines in the event of a predefined state of one or more alarms. It will also be possible to define several alarm levels for each individual sensor, such as, for example, for a visual alarm to be given at a first level, an audible alarm is activated at a second level, and at a third temperature level the drive speed or load on the engine or engines is lowered, or they are stopped.

It will be obvious to a person skilled in the art that within the scope of the invention it will be possible to implement a number of variations and alternatives. For example, the physical shape of the bolt 15 can be altered in order to be adapted to the component in which the sensor is to be mounted. Moreover, it will be appreciated that the sensor according to the invention is suitable for monitoring the temperature in a great many different components in machines and vehicles, and not only those which are mentioned herein. It will also be possible to perform the actual signal processing in the control unit in order to derive the temperature of the sensor in a number of different ways.

In a preferred embodiment the modified polling signal is composed of reflections from several points on the chip's surface, and with suitable measuring equipment the absolute phases from each individual reflection are measured. By combining these different absolute phases in order preferably to bring out certain differences between them, it is possible to determine the temperature unambiguously, and independently of the path which the signal has taken between sensor and control unit and the related delay. By calculating such differences, moreover, it is possible to achieve the same as is obtained by having a separate reference element with which the measurements are compared. It can therefore be said that one has a reference on the chip. In a preferred embodiment the actual polling signal will have a constant frequency which is amplitude or pulse modulated in order to be able to distinguish the modified polling signal from the original polling signal in the electronic metering circuits. It will also be possible to perform modifications which, for example, employ frequency-modulated polling signals (chirps).

It will also be clear to a person skilled in the art that the processing of the modified polling signal can be distributed between the control unit 3 and the recording unit 4, with certain properties of the signal being derived in the control unit and these being transferred to the recording-unit-for-further processing there, for example for comparison with calibration values for the sensor elements, which can be stored in the control unit or on data files in the recording unit.

What is claimed is:

1. A device for measuring temperature of the inside of an inaccessible movable mechanical part, comprising:
   a temperature-sensitive element from which a measurement of temperature can be obtained and having a SAW chip with temperature-dependent transfer function, the SAW chip having a transducer designed to be connected to an antenna mounted on an outside of said mechanical part,
   an encapsulation for said temperature-sensitive element, the encapsulation being designed to be arranged separately and kept in position at an inner end of a mounting hole in said moving mechanical part and thus exposed to temperature inside the mechanical part, a bolt for closing the mounting hole and a material placed between said bolt and the encapsulation for holding the encapsulation securely in position after mounting, and a transmission line for connecting the antenna to the temperature-sensitive element, whereby the device is adapted for measuring temperature inside the inaccessible mechanical part while the mechanical part is in motion.

2. A device according to claim 1, wherein said material is a spring for pressing the encapsulation against the inner end of the mounting hole.

3. A device according to claim 1, wherein said material is epoxy or a heat-resistant rubber sleeve.

4. A system for monitoring the temperature inside inaccessible movable mechanical parts, comprising:

a sensor for each of the mechanical parts and including a temperature-sensitive element having a SAW chip with a temperature-dependent transfer function, the SAW chip having a transducer connected to a first antenna mounted on the outside of the respective mechanical part;

an encapsulation for the temperature-sensitive element, the encapsulation being placed and kept in position in a mounting hole in the respective mechanical part to measure temperature inside the mechanical part, the temperature-sensitive element being connected to the first antenna via a transmission line; and a second antenna for the sensor of each mechanical part and arranged to transmit signals to and receive signals from the respective sensor via said first antenna while the mechanical part is in motion, said second antenna being connected via a signal cable with a control unit comprising a multiplexer;

wherein the control unit includes means for transmitting a polling signal to and for receiving a modified polling signal from the sensor of each mechanical part via an associated signal cable and associated second antenna while the respective mechanical part is in motion, the control unit further including means for processing the received modified polling signal, and, on the basis of the characteristics of the modified polling signal, for generating a data signal representative for the temperature of the sensor of the respective mechanical part.

5. A system according to claim 4, wherein a plurality of reflectors are provided on said SAW chip, and the control unit includes means for measuring the absolute phases of the components of the modified polling signal connected to the respective reflectors and to generate said data signal on the basis of the differences between these absolute phases.

6. A system according to claim 4 or 5, wherein the control device is further connected to a recording device via a data bus and is arranged to transmit said data signal which is representative for the temperature of the sensor to the recording device.

7. A system according to claim 6, wherein the recording device comprises a store for storing the received data signals or values derived therefrom and a display device for displaying information on these stored values graphically or in the form of alphanumeric characters.

8. A system according to claim 6, wherein the recording device is arranged to generate a signal indicating an alarm condition when it receives a data signal indicating that the temperature at one of the sensors is higher than a predefined threshold value.

9. A system according to claim 8, wherein said signal indicating an alarm condition activates a visual or audible alarm.

10. A system according to claim 8, wherein said signal indicating an alarm condition results in a reduction in the load, a reduction in the drive speed or shutting down of a machine, an engine or a process including the mechanical part whose temperature is being monitored.

* * * * *